US011978400B2

(12) United States Patent
Shin et al.

(10) Patent No.: US 11,978,400 B2
(45) Date of Patent: May 7, 2024

(54) INTEGRATED CIRCUIT FOR DRIVING PIXEL OF DISPLAY PANEL AND METHOD FOR PROCESSING DRIVING SIGNAL OF DISPLAY PANEL IN THE INTEGRATED CIRCUIT

(71) Applicant: LX Semicon Co., Ltd., Daejeon (KR)

(72) Inventors: Jun Young Shin, Daejeon (KR); Ye Ji Lee, Daejeon (KR); Min Young Jeong, Daejeon (KR); Jung Bae Yun, Daejeon (KR)

(73) Assignee: LX SEMICON CO., LTD., Daejeon (KR)

(*) Notice: Subject to any disclaimer, the term of this patent is extended or adjusted under 35 U.S.C. 154(b) by 0 days.

(21) Appl. No.: 18/073,542

(22) Filed: Dec. 1, 2022

(65) Prior Publication Data

US 2023/0178021 A1 Jun. 8, 2023

(30) Foreign Application Priority Data

Dec. 3, 2021 (KR) ........................ 10-2021-0171815

(51) Int. Cl.
*G09G 3/3233* (2016.01)
*G09G 3/3275* (2016.01)

(52) U.S. Cl.
CPC ......... *G09G 3/3233* (2013.01); *G09G 3/3275* (2013.01); *G09G 2300/0842* (2013.01); *G09G 2310/027* (2013.01); *G09G 2310/0286* (2013.01); *G09G 2310/0291* (2013.01); *G09G 2310/08* (2013.01); *G09G 2320/0233* (2013.01); *G09G 2320/0295* (2013.01)

(58) Field of Classification Search
None
See application file for complete search history.

(56) References Cited

U.S. PATENT DOCUMENTS

2009/0184901 A1* 7/2009 Kwon .................. G09G 3/3233 345/77
2016/0125840 A1* 5/2016 Oh ......................... G09G 5/006 345/76
2022/0068223 A1* 3/2022 Kim ..................... G09G 3/3291

FOREIGN PATENT DOCUMENTS

KR 2017-0141323 A 12/2017

* cited by examiner

*Primary Examiner* — Christopher J Kohlman
(74) *Attorney, Agent, or Firm* — POLSINELLI PC

(57) ABSTRACT

The present disclosure provides a technology for converting, into digital data, a sensing signal sensed from each pixel of a display panel and compensating for differences between LED elements.

14 Claims, 10 Drawing Sheets

INTEGRATED CIRCUIT FOR DRIVING PIXEL OF DISPLAY PANEL AND METHOD FOR PROCESSING DRIVING SIGNAL OF DISPLAY PANEL IN THE INTEGRATED CIRCUIT

CROSS REFERENCE TO RELATED APPLICATION

This application claims priority from the Republic of Korea Patent Application No. 10-2021-0171815, filed on Dec. 3, 2021, which is hereby incorporated by reference in its entirety.

BACKGROUND

1. Field of Technology

The present embodiment relates to an integrated circuit for driving a pixel of a display panel and a method of processing a driving signal of a display panel in the integrated circuit.

2. Related Technology

As informatization advances, various display devices capable of visualizing information are being developed. A liquid crystal display (LCD), an organic light-emitting diode (OLED) display device, a plasma display panel (PDP) display device, etc. are display devices that have been developed so far or are being developed. Such display devices are developed in a way to properly display a high-resolution image.

A method of driving a display panel in which LEDs are disposed may include several methods. Representative methods include a pulse amplitude modulation (PAM) method and a pulse width modulation (PWM) method. The PAM method is a method of supplying a pixel with an analog voltage corresponding to a grayscale value of the pixel and differently controlling the size of a current that flows into the pixel based on the analog voltage. The PWM method is a method of adjusting the time of a current that is supplied to a pixel based on a grayscale value of the pixel.

For example, a display panel includes multiple pixels. As a light-emitting diode (LED) emits light based on a current that flows into the light-emitting diode included in each pixel, a desired image may be displayed.

A display device may convert image data that has been input to a data processing circuit or a controller (e.g., a timing controller T-CON) into data (e.g., RGB data) having a proper format in order to display a desired image through a display panel, and may transfer the data to a data driving circuit (e.g., a source driver IC (SD-IC)). The data driving circuit may supply each pixel with a data voltage for driving each of the pixels included in the display panel, based on the image data received from the data processing circuit or the controller.

In driving the display panel by the data driving circuit, LED (e.g., OLED) elements may differently emit light due to a deviation (e.g., a deviation between threshold voltages Vth or mobility) between the LED elements although the same data voltage is applied to pixels. In order to solve such a problem, a sensing circuit may sense a voltage that is supplied to each pixel through a sensing line connected to each pixel so that an LED element emits light with desired brightness based on a sensed value for each pixel.

The sensing circuit may convert, into digital data, analog data sensed in each pixel by using an analog-to-digital converter in order to identify differences between the LED elements. The analog-to-digital converter constructed in the sensing circuit may operate sensitively depending on a surrounding environment. There is a problem in that it is difficult to obtain an accurate sensing value because such a change in the surrounding environment acts as interference with the analog-to-digital converter.

The discussions in this section are only to provide background information and does not constitute an admission of prior art.

SUMMARY

In such a background, in an aspect, the present embodiment is to provide an integrated circuit for driving a pixel of a display panel and a method of processing a driving signal of a display panel in the integrated circuit, which can solve a problem in that an error occurs in a sensing value because a data voltage for driving each pixel acts as noise in a sensing circuit when the data driving circuit provides the data voltage.

In an aspect, the present embodiment provides an integrated circuit including: a data driving circuit configured to provide a pixel with a data voltage corresponding to image data through a data line connected to the pixel of a display panel; a sensing circuit configured to receive a sensing signal for the pixel through a sensing line connected to the pixel and generate pixel sensing data by converting the received sensing signal into digital data, and a controller configured to control the data driving circuit and the sensing circuit. The data driving circuit includes a shift register circuit configured to sequentially shift sampling start signals by using a clock signal included in a signal received from a data processing circuit, a latch circuit configured to sequentially latch data of respective channels supplied by the data processing circuit based on the sampling start signals output by the shift register circuit, a digital-to-analog converter configured to convert, into analog image data, digital image data latched in the latch circuit, and an output buffer configured to output the analog image data converted by the digital-to-analog converter through the data line. The controller controls at least one of the shift register circuit and the latch circuit included in the data driving circuit for a time interval in which the sensing circuit converts the sensing signal into the digital data so that the image data is not changed.

In another aspect, the present embodiment provides an integrated circuit, including a data driving circuit configured to provide a pixel with a data voltage corresponding to image data through a data line connected to the pixel of a display panel, a sensing circuit configured to receive a sensing signal for the pixel through a sensing line connected to the pixel and generate pixel sensing data by converting the received sensing signal into digital data, and a controller configured to perform control so that the image data of the data driving circuit is not changed for a time interval in which the sensing circuit converts the sensing signal into the digital data.

In still another aspect, the present embodiment provides a method of outputting a driving signal of a display panel in an integrated circuit, including providing a pixel with a data voltage corresponding to image data through a data line connected to the pixel of a display panel, identifying sensing operation information based on a signal received from the data processing circuit, when identifying the sensing enable information as a result of the identification of the sensing operation information, receiving a sensing signal for the pixel through a sensing line connected to the pixel, and generating, by a sensing circuit, pixel sensing data by converting the received sensing signal into digital data, wherein control is performed for a time interval in which the sensing circuit converts the sensing signal into the digital data so that the image data of a data driving circuit is not changed.

As described above, according to the present embodiment, noise can be prevented from occurring in the sensing circuit because output image data is not changed when the analog-digital converter (ADC) of the sensing circuit operates in the data driving circuit that provides a data voltage for driving each pixel.

Accordingly, the sensing circuit can obtain more accurate sensing data because the accuracy of the ADC is improved. The display device can compensate for a deviation between LED (e.g., OLED) elements based on a more accurate value. Furthermore, as a deviation between the LED elements is compensated for with a more accurate value, each LED element can emit light with desired brightness with respect to image data.

DETAILED DESCRIPTION OF EMBODIMENTS

Figure 1:
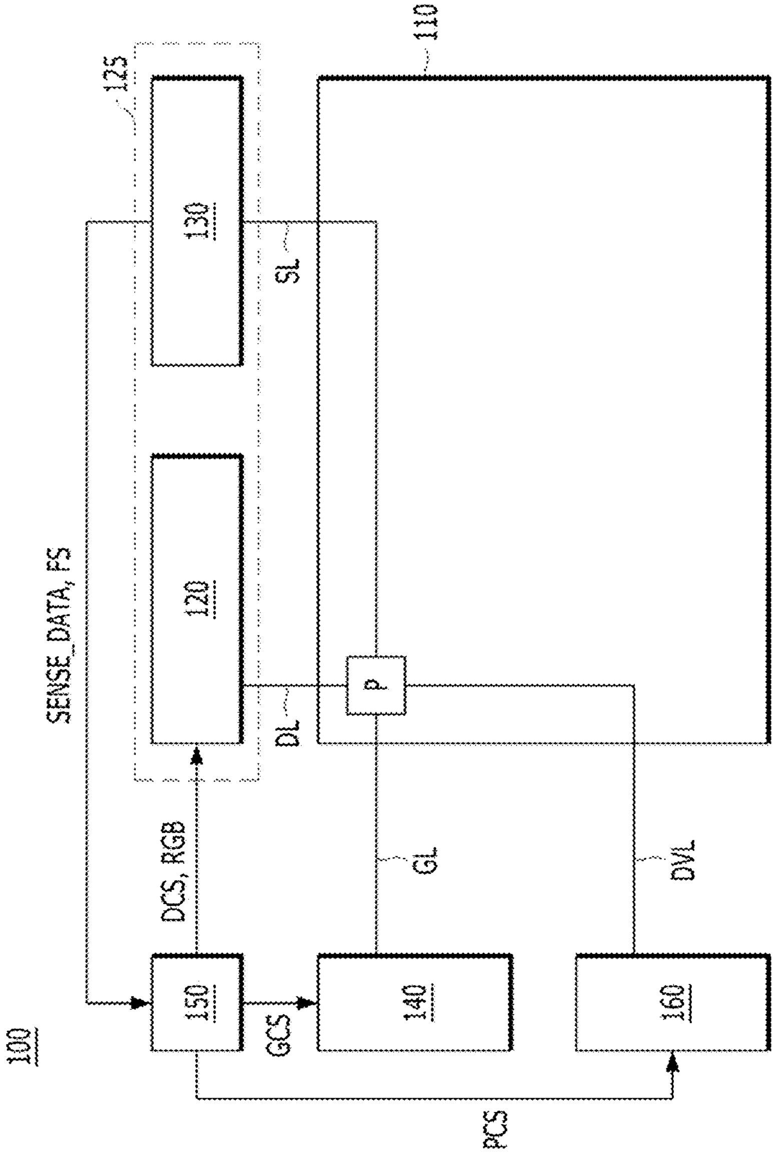
FIG. 1 is a construction diagram of a display device according to an embodiment.

FIG. 1 is a construction diagram of a display device according to an embodiment.

Referring to FIG. 1, a display device 100 may include a panel 110 and an apparatus 120, 130, 140, 150, and 160 for driving the panel 110.

A plurality of data lines DL, a plurality of gate lines GL, a plurality of sensing line SL, and a plurality of driving voltage lines DVL may be disposed in the panel 110. A plurality of pixels P may be disposed in the panel 110.

The apparatus for driving the panel may include a data driving circuit 120, a sensing circuit 130, a gate driving circuit 140, a data processing circuit 150, and a power supply circuit 160.

In the apparatus for driving the panel, the gate driving circuit 140 may supply a scan signal having a turn-on voltage or a turn-off voltage to the gate line GL. When the scan signal having a turn-on voltage is supplied to the pixel P, the pixel P is connected to the data line DL. When the scan signal having a turn-off voltage is supplied to the pixel P, a connection between the pixel P and the data line DL is released.

In the apparatus for driving the panel, the data driving circuit 120 supplies the data line DL with a data voltage. The data voltage supplied to the data line DL may be transferred to the pixel P connected to the data line DL in response to a scan signal.

In the apparatus for driving the panel, the sensing circuit 130 may receive a sensing signal, for example, a voltage or a current that is formed in each pixel P.

The sensing circuit 130 may be connected to each pixel Pin response to the scan signal, and may be connected to each pixel P in response to a separate sensing signal. In this case, the sensing signal may be generated by the gate driving circuit 140.

In the apparatus for driving the panel, the data processing circuit 150 may supply various control signals to the gate driving circuit 140, the data driving circuit 120, the sensing circuit 130, and the power supply circuit 160. The data processing circuit 150 may generate a gate control signal GCS that enables the start of scan based on timing that is implemented in each frame, and may transmit the gate control signal GCS to the gate driving circuit 140. Furthermore, the data processing circuit 150 may output, to the data driving circuit 120, the image data RGB that has been changed from external input image data according to a data signal format that is used in the data driving circuit 120. Furthermore, the data processing circuit 150 may transmit a data control signal DCS that controls the data driving circuit 120 to supply a data voltage to each pixel P based on each piece of timing. Furthermore, the data processing circuit 150 may transmit a power control signal PCS that controls the power supply circuit 160 to supply a driving voltage to each pixel P.

The data processing circuit 150 may compensate for the image data RGB based on characteristics of the pixel P, and may transmit the compensated image data. At this time, the data processing circuit 150 may receive sensing data SENSE_DATA from the sensing circuit 130. The sensing data SENSE_DATA may include a measured value for the characteristics of the pixel P. The sensing circuit 130 may transmit a fault signal FS to the data processing circuit 150. The sensing circuit 130 may generate the fault signal FS when an abnormal signal higher than an input range is input. The fault signal FS may include information on a pixel that has received an abnormal signal, information on a channel that has received an abnormal signal, or information on a sensing line SL that has received an abnormal signal.

The data driving circuit 120 may be named a source driver. Furthermore, the gate driving circuit 140 may be named a gate driver. Furthermore, the data processing circuit 150 may be named a timing controller T-CON.

The data driving circuit 120 and the sensing circuit 130 may be included in one integrated circuit (IC) 125, and may be named a source driver IC. Furthermore, the data driving circuit 120, the sensing circuit 130, and the data processing circuit 150 may be included in one integrated circuit, and may be named an integrated IC. The present embodiment is not limited to such names. In the following description of embodiments, a description of some components that are commonly known in the source driver, the gate driver, the timing controller, etc. is omitted. Accordingly, in the understanding of an embodiment, the omission of such some components needs to be taken into consideration.

The panel 110 may be an organic light-emitting display panel. In this case, the pixel P disposed in the panel 110 may include an organic light-emitting diode (OLED) and one or more transistors. Characteristics of the OLED and the transistor that are included in each pixel P may be changed over time or depending on a surrounding environment. The sensing circuit 130 according to an embodiment may sense characteristics of such components that are included in each pixel P, and may transmit, to the data processing circuit 150, data, information, or a signal corresponding to the characteristics of the components.

Figure 2:
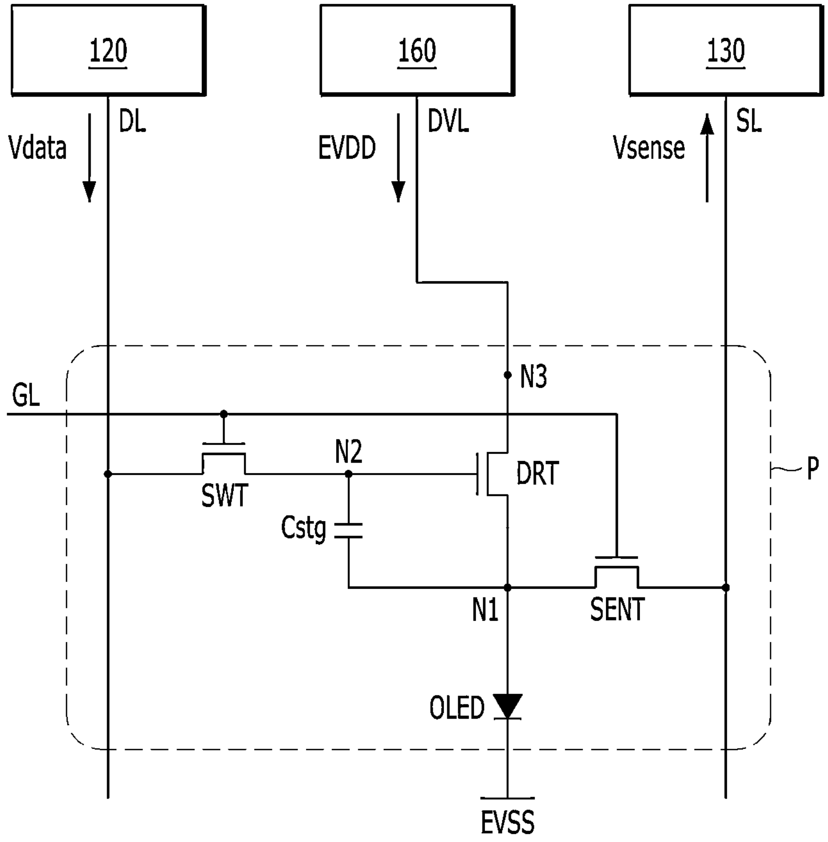
FIG. 2 is a diagram illustrating voltages that are input and output from each circuit of the display device to a pixel according to an embodiment.

FIG. 2 is a diagram illustrating a pixel structure of each pixel in FIG. 1, and voltages that are input to and output from a pixel in and the data driving circuit, the power supply circuit and the sensing circuit.

Referring to FIG. 2, the pixel P may include an OLED, a driving transistor DRT, a switching transistor SWT, a sensing transistor SENT, a storage capacitor Cstg, etc.

The OLED may include an anode electrode, an organic layer, a cathode electrode, etc. The OLED may emit light as the anode electrode is connected to a driving voltage EVDD supplied by the power supply circuit 160 and the cathode electrode is connected to a base voltage EVSS under the control of the driving transistor DRT.

The driving transistor DRT may control brightness of the OLED by controlling a driving current that is supplied to the OLED.

A first node N1 of the driving transistor DRT may be electrically connected to the anode electrode of the OLED, and may be a source node or a drain node. A second node N2 of the driving transistor DRT may be electrically connected to a source node or drain node of the switching transistor SWT, and may be a gate node. A third node N3 of the driving transistor DRT may be electrically connected to the driving voltage line DVL that supplies the driving voltage EVDD, and may be a drain node or a source node.

The switching transistor SWT may be electrically connected between the data line DL and the second node N2 of the driving transistor DRT, and may be turned on by being supplied with a scan signal through the gate line GL.

When the switching transistor SWT is turned on, a data voltage Vdata that is supplied through the data line DL by the data driving circuit 120 may be transferred to the second node N2 of the driving transistor DRT.

The storage capacitor Cstg may be electrically connected between the first node N1 of the driving transistor DRT and the second node N2.

The storage capacitor Cstg may be a parasitic capacitor that is present between the first node N1 of the driving transistor DRT and the second node N2, or may be an external capacitor of the driving transistor DRT that has been intentionally designed on the outside.

The sensing transistor SENT may connect the first node N1 of the driving transistor DRT and the sensing line SL. The sensing line SL may transfer a characteristic value (e.g., a voltage) of the first node N1 to the sensing circuit 130.

Furthermore, the sensing circuit 130 may measure characteristics of the pixel P by using a sensing signal Vsense that is transferred through the sensing line SL.

A threshold voltage Vth, mobility, etc. of the driving transistor DRT may be identified by measuring a voltage of the first node N1. Furthermore, the degree of degradation of an OLED, such as parasitic capacitance of the OLED, may be identified by measuring a voltage of the first node N1.

The sensing circuit 130 may measure a voltage of the first node N1, and may transmit the measured value to a data processing circuit (e.g., the data processing circuit 150 in FIG. 1).

Furthermore, the data processing circuit (e.g., the data processing circuit 150 in FIG. 1) may identify characteristics of each pixel P by analyzing such a voltage of the first node N1.

Figure 3:
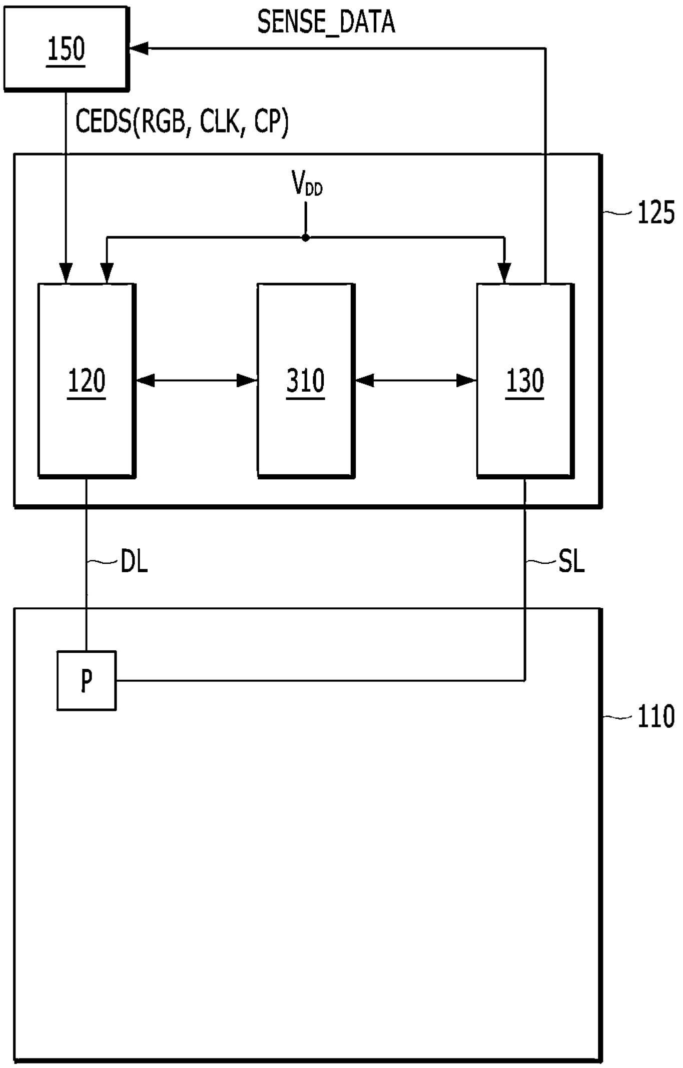
FIG. 3 is a block diagram illustrating a structure of an integrated circuit according to an embodiment.

FIG. 3 is a block diagram illustrating a structure of an integrated circuit according to an embodiment.

Referring to FIG. 3, the integrated circuit 125 according to an embodiment may include the data driving circuit 120, the sensing circuit 130, and a controller 310. As described above, in an embodiment, the data processing circuit 150 may change external input image data based on a data signal format that is used in the data driving circuit 120, and may output the changed image data (e.g., RGB) to the data driving circuit 120. Furthermore, the data processing circuit 150 may transmit the data control signal DCS that controls the data driving circuit 120 to supply each pixel P with a data voltage corresponding to image data based on each piece of timing.

In an embodiment, a signal that is transmitted from the data processing circuit 150 to the integrated circuit 125 may be a signal having a clock embedded differential signal (CEDS) format, but this is illustrative. The following embodiments are not limited to such a format. For example, the CEDS may include a clock signal CLK (e.g., clock training data), display data RGB (e.g., red/white/blue/green (RWBG) data), and a control packet CP for various types of control. The clock signal CLK, the display data RGB, and the control packet CP that are included in the CEDS may be alternately transmitted in a set order.

In an embodiment, the control packet may include sensing operation data SENSING EN indicating whether sensing has been enabled. For example, when the sensing operation data SENSING EN is indicated as high H, a sensing operation may be enabled. When the sensing operation data SENSING EN is indicated as low L, a sensing operation that is ongoing may be disabled. Furthermore, for example, when the sensing operation data SENSING EN is indicated as low L, a sensing operation may be enabled. When the sensing operation data SENSING EN is indicated as high H, a sensing operation that is ongoing may be disabled.

In an embodiment, when the sensing operation data SENSING EN is indicated as high H, as described above with reference to FIG. 2, the state of the sensing transistor SENT may be controlled to an ON state, so that the sensing line SL may transfer a characteristic value of the first node N1, for example, a voltage to the sensing circuit 130.

In an embodiment, in driving each pixel within the panel 110 by the data driving circuit 120, each pixel P (e.g., an OLED element) may differently emit light although the same data voltage is supplied to each pixel due to a deviation (e.g., a deviation such as a threshold voltage Vth or mobility) between pixels P (e.g., OLED elements). In order to solve such a problem, the sensing circuit 130 may sense a voltage (e.g., Vsense) that is supplied to each pixel P through the sensing line SL connected to each pixel, so that an LED element emits light with desired brightness by using a sensed value Vsense for each pixel P.

In an embodiment, a driving voltage $V_{DD}$ having a relatively high voltage may be supplied to the data driving circuit 120 and the sensing circuit 130. For example, the driving voltage $V_{DD}$ may be supplied to the output buffer of the data driving circuit 120, and may be also supplied to an analog-to-digital converter (ADC) of the sensing circuit 130.

As described above, as the driving voltage $V_{DD}$ is simultaneously supplied to the data driving circuit 120 and the sensing circuit 130, output data of the data driving circuit 120 may act as noise or interference because the output data of the data driving circuit 120 affects performance of the ADC. If a change in the output data of the data driving circuit 120 acts as interference with the ADC, it may be difficult for the sensing circuit to obtain an accurate sensing value.

In the following various embodiments, the controller 310 included in the integrated circuit 125 may perform control so that image data output by the data driving circuit 120 is not changed for the time interval in which the sensing circuit 130 converts the sensing signal into the digital data. Accordingly, a more accurate sensing value can be obtained because the ADC included in the sensing circuit 130 is not affected by the image data output by the data driving circuit 120.

For example, the controller 310 may identify a time interval in which the sensing circuit 130 converts a sensing signal into digital data through sensing operation data SENSING EN that is included in the CEDS received from the data processing circuit 150. In another embodiment, when the ADC included in the sensing circuit 130 converts a received sensing signal into digital data, the controller 310 may identify timing at which the time interval in which the sensing signal is converted into the digital data is terminated, based on the last signal of a shift register that controls timing of the switches of a sample and hold circuit.

In an embodiment, the controller 310 may perform control so that image data output by the data driving circuit 120 is not changed for the identified time interval in which the ADC operates.

Hereinafter, various embodiments in which the controller 310 controls the data driving circuit 120 so that image data output by the data driving circuit 120 is not changed are described with reference to FIGS. 4 and 5.

Figure 4:
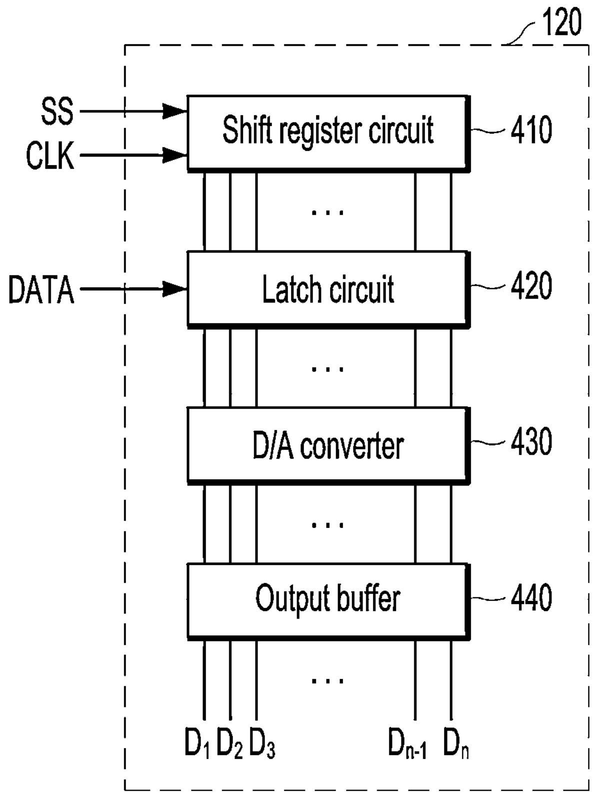
FIG. 4 is a block diagram illustrating a structure of a data driving circuit according to an embodiment.

FIG. 4 is a block diagram illustrating a structure of a data driving circuit according to an embodiment.

Referring to FIG. 4, the data driving circuit 120 may include a shift register circuit 410, a latch circuit 420, a digital-to-analog converter (DAC) (D/A converter) 430, and an output buffer 440.

The shift register circuit 410 sequentially shifts sampling start signals SS by using a clock signal CLK.

The latch circuit 420 sequentially latches RGB image data (hereinafter referred to as "data") DATA of each channel that is supplied by the data processing circuit 150 by using a sampling start signal output by the shift register circuit 410.

The D/A converter 430 converts, into analog image data, the digital image data latched in the latch circuit 420. The analog image data may have a positive value or a negative value with respect to a common voltage Vcom in response to a polarity signal POL.

The output buffer 440 buffers and amplifies the analog image data converted by the D/A converter 430, and outputs the amplified image data to a data line $D_1$ to $D_n$ corresponding to the channel of each pixel. For example, the output buffer 440 may include a power amplifier (or a source amplifier). The driving voltage $V_{DD}$ having a relatively high voltage, which has been described with reference to FIG. 3, may be supplied to the power amplifier. In an embodiment, the same driving voltage $V_{DD}$ may also be supplied to the ADC of the sensing circuit 130. If image data output by the output buffer 440 is changed, noise or interference may occur in the ADC because the driving voltage $V_{DD}$ is shared.

Figure 5:
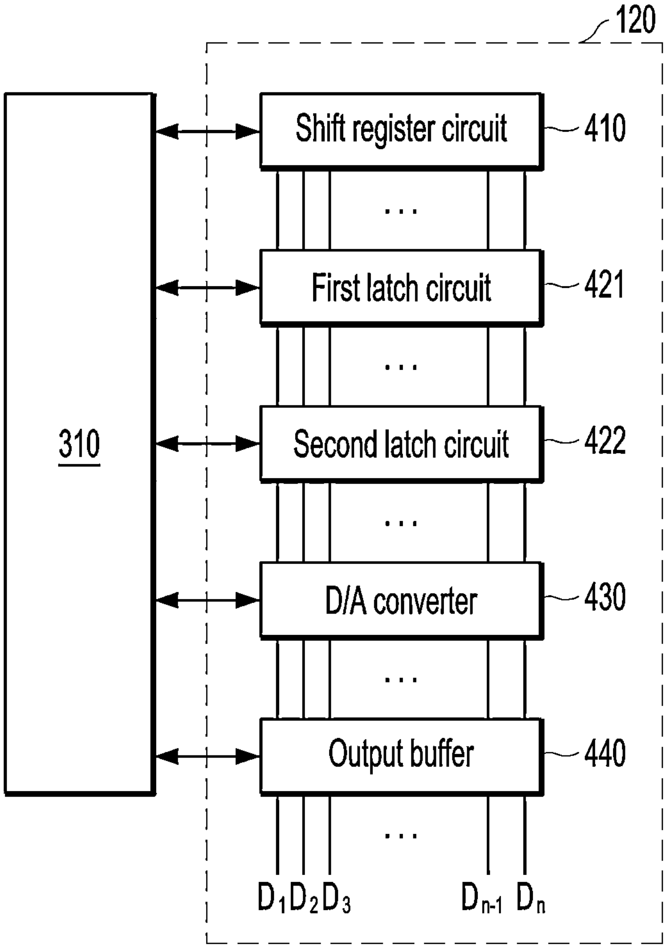
FIG. 5 is a block diagram illustrating a structure of a data driving circuit according to an embodiment.

FIG. 5 is a block diagram illustrating a structure of a data driving circuit according to an embodiment.

Referring to FIG. 5, the data driving circuit 120 may include a shift register circuit 410, a first latch circuit 421, a second latch circuit 422, a D/A converter 430, and an output buffer 440.

The shift register circuit 410 sequentially shifts the sampling start signals SS by using the clock signal CLK.

The first latch circuit 421 may play a role as a sampling buffer, and sequentially latches image data of channels that are supplied by the data processing circuit 150 by using a sampling start signal output by the shift register circuit 410. For example, when the data driving circuit 120 continuously receives CEDSs from the data processing circuit 150, the first latch circuit 421 may update image data that is received every clock.

The second latch circuit 422 may play a role as a hold latch, and may latch image data of channels that are latched in the first latch circuit 421 based on timing set by the controller 310, for example.

The D/A converter 430 converts, into analog image data, the digital image data that has been latched in the second latch circuit 422. The analog image data may have a positive value or a negative value with respect to the common voltage Vcom in response to the polarity signal POL.

The output buffer 440 buffers or amplifies the analog image data converted by the D/A converter 430, and outputs the amplified image data to the data line $D_1$ to $D_n$ corresponding to the channel of each pixel. For example, the output buffer 440 may include a power amplifier (or a source amplifier). The driving voltage $V_{DD}$ having a relatively high voltage, which has been described with reference to FIG. 3, may be supplied to the power amplifier.

In an embodiment, the same driving voltage $V_{DD}$ may also be supplied to the ADC of the sensing circuit 130. If image data output by the output buffer 440 is changed, noise or interference may occur in the ADC of the sensing circuit 130 because the driving voltage $V_{DD}$ is shared.

In an embodiment, the controller 310 can reduce or prevent the occurrence of noise or interference by controlling image data output by the data driving circuit 120 so that the image data is not changed for a time interval in which the sensing circuit 130 converts a sensing signal into digital data.

For example, the controller 310 may identify a time interval in which the sensing circuit 130 converts a sensing signal into digital data through sensing operation data SENSING EN included in a CEDS that is received from the data processing circuit 150.

In another embodiment, the controller 310 may identify timing at which a time interval in which a received sensing signal is converted into digital data is terminated, based on the last signal of a shift register that controls timing of the switches of a sample and hold circuit when the ADC included in the sensing circuit 130 converts the received sensing signal into the digital data.

In an embodiment, the controller 310 may perform control so that image data output by the data driving circuit 120 is not changed for the identified time interval in which the ADC operates.

In an embodiment, the controller 310 may perform control so that a clock signal is not transmitted to the shift register circuit 410 for the time interval in which the sensing circuit 130 converts the sensing signal into the digital data.

As the clock signal is not transmitted to the shift register circuit 410 under the control of the controller 310, the first latch circuit 421 may not operate. If the first latch circuit 421 does not operate, although new image data is received from the data processing circuit 150, image data stored in the first latch circuit 421 may not be updated.

If the image data stored in the first latch circuit 421 is not updated, the second latch circuit 422 may continuously output the same image data as previous image data to the D/A converter 430. As the same image data is input to the D/A converter 430, the output buffer 440 may continuously output image data having the same voltage.

For a time interval in which the ADC of the sensing circuit 130 converts the sensing signal into the digital data, image data output by the data driving circuit 120 (e.g., the output buffer 440) is not changed and is identically maintained. Accordingly, the occurrence of noise or interference in the sensing circuit 130 (e.g., the ADC) can be reduced or prevented.

In another embodiment, the controller 310 may perform control so that an operation of the first latch circuit 421 is stopped for the time interval in which the sensing circuit 130 converts the sensing signal into the digital data. If the first latch circuit 421 does not operate, although new image data is received from the data processing circuit 150, image data stored in the first latch circuit 421 may not be updated.

If the image data stored in the first latch circuit 421 is not updated, the second latch circuit 422 may continuously output the same image data as previous image data to the D/A converter 430. As the same image data is input to the D/A converter 430, the output buffer 440 may continuously output image data having the same voltage.

For the time interval in which the ADC of the sensing circuit 130 converts the sensing signal into the digital data, image data output by the data driving circuit 120 (e.g., the output buffer 440) is not changed and is identically maintained. The occurrence of noise or interference in the sensing circuit 130 (e.g., the ADC) can be reduced or prevented.

In another embodiment, the controller 310 may perform control so that image data of each channel received from the data processing circuit 150 is not transmitted to the first latch circuit 421 for the time interval in which the sensing circuit 130 converts the sensing signal into the digital data. If new image data is not transmitted to the first latch circuit 421, image data stored in the first latch circuit 421 can maintain previous image data without being updated.

If the image data stored in the first latch circuit 421 maintains previous image data without being updated, the second latch circuit 422 may continuously output the same image data as the previous image data to the D/A converter 430. As the same image data is input to the D/A converter 430, the output buffer 440 may continuously output image data having the same voltage.

For the time interval in which the ADC of the sensing circuit 130 converts the sensing signal into the digital data, image data output by the data driving circuit 120 (e.g., the output buffer 440) is not changed and is identically maintained. Accordingly, the occurrence of noise or interference in the sensing circuit 130 (e.g., the ADC) can be reduced or prevented.

In another embodiment, the controller 310 may perform control so that image data is not transmitted from the first latch circuit 421 to the second latch circuit 422 for the time interval in which the sensing circuit 130 converts the sensing signal into the digital data.

If image data is not transmitted from the first latch circuit 421 to the second latch circuit 422, the second latch circuit 422 may continuously output, to the D/A converter 430, image data that has not been updated with new image data and that is the same as previous image data. As the same image data is input to the D/A converter 430, the output buffer 440 may continuously output image data having the same voltage.

For the time interval in which the ADC of the sensing circuit 130 converts the sensing signal into the digital data, image data output by the data driving circuit 120 (e.g., the output buffer 440) is not changed and is identically maintained. Accordingly, the occurrence of noise or interference in the sensing circuit 130 (e.g., the ADC) can be reduced or prevented.

Figure 6:
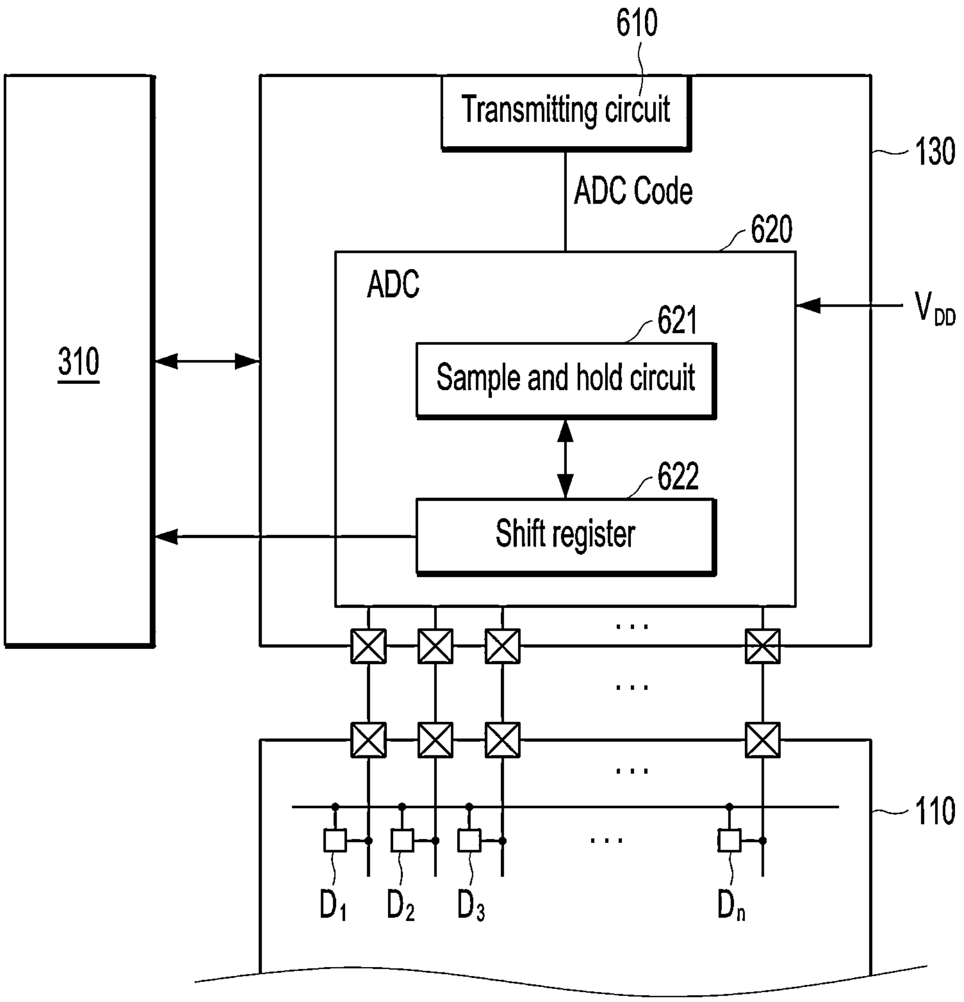
FIG. 6 is a block diagram illustrating a structure of a sensing circuit according to an embodiment.

FIG. 6 is a block diagram illustrating a structure of a sensing circuit according to an embodiment.

Referring to FIG. 6, in an embodiment, the sensing circuit 130 may include a transmitting circuit 610 and an ADC 620. The ADC 620 may convert a sensing signal that is received through the sensing line of each pixel P included in the panel 110 as described above from analog data to digital data. The sensing data of a pixel converted into the digital data through the ADC 620 may be transmitted to another block (e.g., the data processing circuit 150) through the transmitting circuit 610.

In an embodiment, the same driving voltage $V_{DD}$ as the driving voltage $V_{DD}$ that is supplied to the output buffer 440 included in the data driving circuit 120 as described above may be supplied to the ADC 620. If image data output by the output buffer 440 is changed, noise or interference may occur in the ADC 620 because the driving voltage $V_{DD}$ is shared.

In an embodiment, the ADC 620 may include a sample and hold circuit 621 and a shift register 622. For example, the shift register 622 may control timing of the switches of the sample and hold circuit 621.

In an embodiment, the controller 310 may identify a time interval in which the ADC 620 converts a sensing signal into digital data is terminated based on the last signal of the shift register 622. For example, when the last signal for controlling timing of the switches of the sample and hold circuit 621 is generated, the shift register 622 may transmit, to the controller 310, a flag indicating that an operation of the ADC 620 is terminated. The controller 310 may receive the flag from the shift register 622, and may identify that the operation of the ADC 620 is terminated.

In an embodiment, when identifying that the operation of the ADC 620 is terminated, the controller 310 may perform control so that the output of image data of the data driving circuit 120 operates normally. For example, the controller 310 may stop the control operation described with reference to FIG. 5, and may control the shift register circuit 410 and a latch circuit (e.g., the first latch circuit 421 or the second latch circuit 422) of the data driving circuit 120 so that the shift register circuit 410 and the latch circuit process image data normally.

Figure 7:
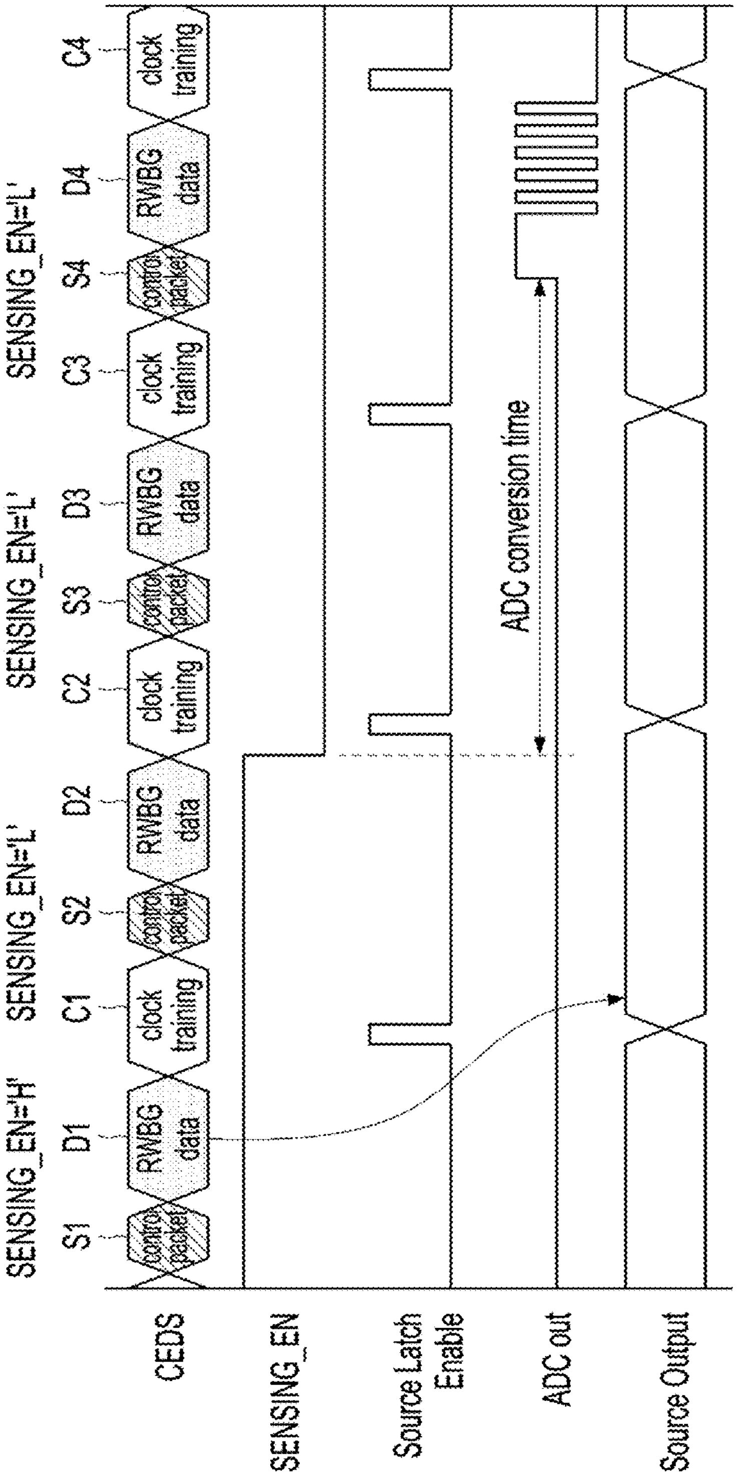
FIG. 7 is a timing diagram illustrating signals that are processed by the integrated circuit according to an embodiment.

FIG. 7 is a timing diagram illustrating signals that are processed by the integrated circuit according to an embodiment.

Referring to FIG. 7, in an embodiment, a signal that is transmitted from the data processing circuit 150 to the integrated circuit 125 may be a signal having a clock embedded differential signal (CEDS) format. For example, the CEDS may include a clock signal CLK (e.g., clock training data C1, C2, C3, C4, . . . ), display data RGB (e.g., red/white/blue/green (RWBG) data D1, D2, D3, D4, . . . ), and a control packet (CP) for various types of control. The clock signal CLK, the display data RGB, and the control packet CP included in the CEDS may be alternately transmitted in a set order. For example, as illustrated in FIG. 7, a first control packet S1, first display data D1, a first clock signal C1, a second control packet S2, second display data D2, a second clock signal C2, a third control packet S3, third display data D3, a third clock signal C3, a fourth control packet S4, fourth display data D4, and a fourth clock signal C4 may be sequentially transmitted, but the present embodiment is not limited to the order. For example, it may be understood that the CEDS is transmitted in order of the clock signal, the control packet, and the display data.

As described above, the control packet S1, S2, S3, S4 may include sensing operation data SENSING EN, . . . indicating whether sensing has been enabled. For example, when the sensing operation data SENSING EN is indicated as high H, a sensing operation may be enabled. When the sensing operation data SENSING EN is indicated as low L, a sensing operation that is ongoing may be disabled. As described above, the high H and low L states may be inversely set.

In an embodiment, when the sensing operation data SENSING EN is indicated as high H, as described above with reference to FIG. 2, the state of the sensing transistor SENT may be controlled to an ON state. Accordingly, the sensing line SL may transfer a characteristic value (e.g., a voltage) of the first node N1 to the sensing circuit 130.

Referring to FIG. 7, as the first sensing operation data included in a first control packet S1 is indicated as high, the state of the sensing enable signal SENSING_EN becomes a high state, and thus the state of the sensing transistor SENT may be controlled to the ON state. As the second sensing operation data included in a second control packet S2 is indicated as low, the state of the sensing enable signal SENSING_EN becomes a low state. Accordingly, the state of the sensing transistor SENT may be controlled to an OFF state at timing of a next clock signal (e.g., the second clock signal C2).

In an embodiment, the driving signal (Source Latch Enable) of the second latch circuit 422 may be applied to the second latch circuit 422 in response to each clock signal (e.g., C1, C2, C3, C4). As described above, the ADC 620 of the sensing circuit 130 may start its operation from timing at which the state of the sensing enable signal SENSING_EN becomes a low state. The operation time (ADC conversion time) of the ADC 620 may be greater than several or tens of clock times, but the present embodiment is not limited thereto. During the operation time of the ADC 620, a sensing signal for a set number of channels (e.g. 250 channels), among a plurality of channels that is included in the panel 110, may be converted into digital data. For example, when an operation of the ADC 620 is terminated, output data (ADC out) of the ADC 620 may be transmitted through the transmitting circuit 610.

As illustrated in FIG. 7, as the operation time (ADC conversion time) of the ADC 620 is greater than several or tens of clock times, the driving signal (Source Latch Enable) of the second latch circuit 422 may be applied to the second latch circuit 422 in response to each clock signal (e.g., C2, C3, C4) for the operating time. As the driving signal (Source Latch Enable) of the second latch circuit 422 is applied to the second latch circuit 422 in response to the clock signals C2 and C3, output image data (Source Output) (e.g., output image data of the output buffer 440) of the data driving circuit 120 may be changed during the operating time (ADC conversion time) of the ADC 620 of the sensing circuit 130.

In an embodiment, the same driving voltage $V_{DD}$ as the driving voltage of the output buffer 440 may also be supplied to the ADC 620 of the sensing circuit 130. If image data (Source Output) output by the output buffer 440 is changed, noise or interference may occur in the ADC 620 during the operation time (ADC conversion time) of the ADC 620 because the driving voltage $V_{DD}$ is shared.

In an embodiment, the controller 310 can reduce or prevent the occurrence of noise or interference by controlling image data (Source Output) output by the data driving circuit 120 (e.g., the output buffer 440) so that the image data is not changed for a time interval in which the ADC 620 of the sensing circuit 130 converts a sensing signal into digital data.

Hereinafter, a method of controlling, by the controller 310, image data (Source Output) output by the data driving circuit 120 (e.g., the output buffer 440) so that the image data is not changed for a time interval in which the ADC 620 of the sensing circuit 130 converts a sensing signal into digital data is described with reference to timing diagrams of FIGS. 8 and 9.

Figure 8:
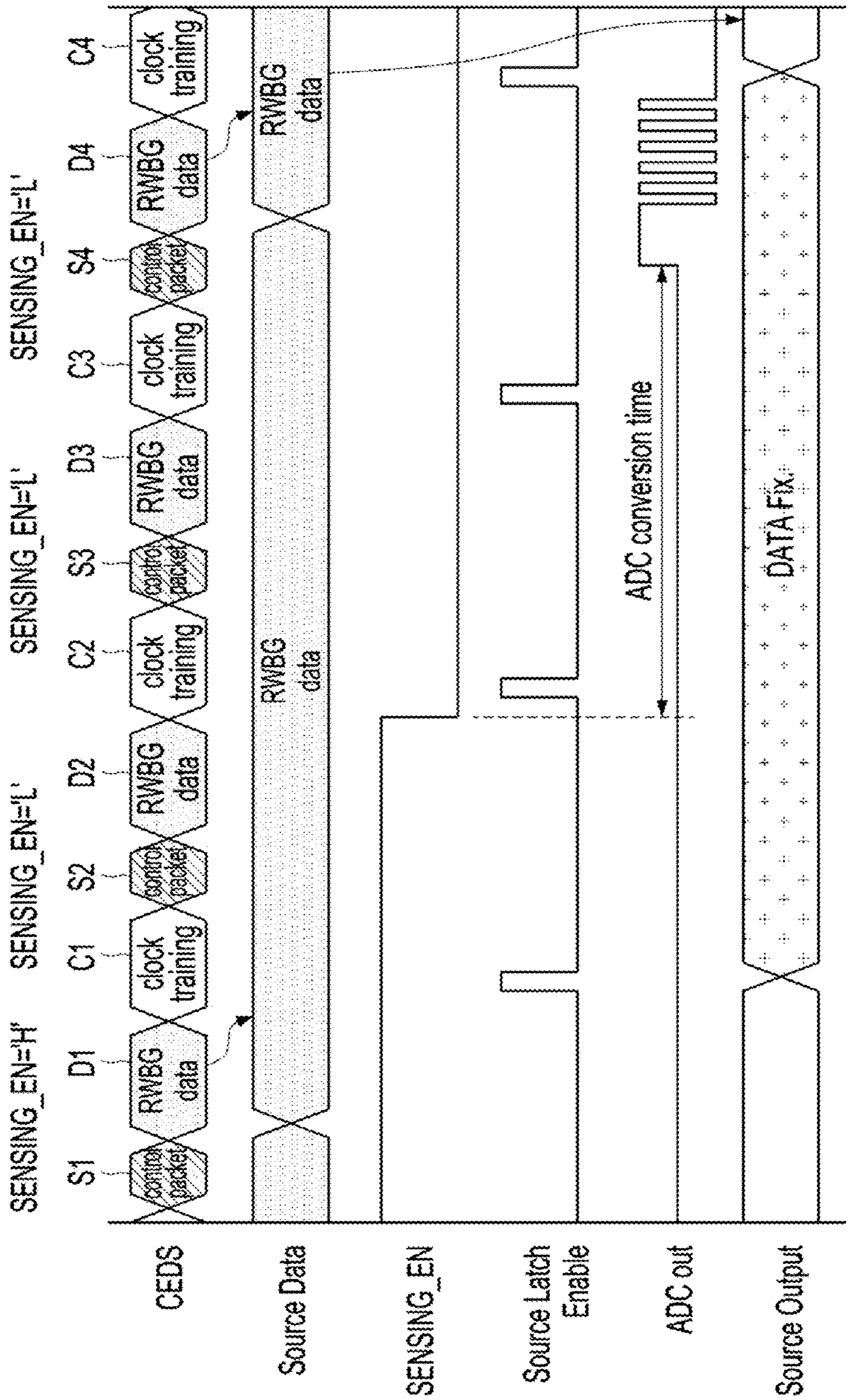
FIG. 8 is a timing diagram illustrating signals that are processed by the integrated circuit according to an embodiment.

FIG. 8 is a timing diagram illustrating signals that are processed by the integrated circuit according to an embodiment.

Referring to FIG. 8, as described above with reference to FIG. 5, the controller 310 may perform control so that image data of each channel received from the data processing circuit 150 is not transmitted to the first latch circuit 421 for a time interval in which the ADC 620 of the sensing circuit 130 converts a sensing signal into digital data. If new image data is not transmitted to the first latch circuit 421, image data stored in the first latch circuit 421 can maintain previous image data without being updated.

If the image data stored in the first latch circuit 421 maintains previous image data without being updated, the second latch circuit 422 may continuously output the same image data as the previous image data to the D/A converter 430. As the same image data is input to the D/A converter 430, the output buffer 440 may continuously output image data having the same voltage.

For the time interval in which the ADC of the sensing circuit 130 converts the sensing signal into the digital data, image data output by the data driving circuit 120 (e.g., the output buffer 440) is not changed and is identically maintained. Accordingly, the occurrence of noise or interference in the sensing circuit 130 (e.g., the ADC) can be reduced or prevented.

In an embodiment, when identifying that an operation of the ADC 620 is terminated, the controller 310 performs control so that next display data (e.g., the fourth display data D4) is transmitted to the first latch circuit 421 normally. Accordingly, new image data may be output by the output buffer 440.

Figure 9:
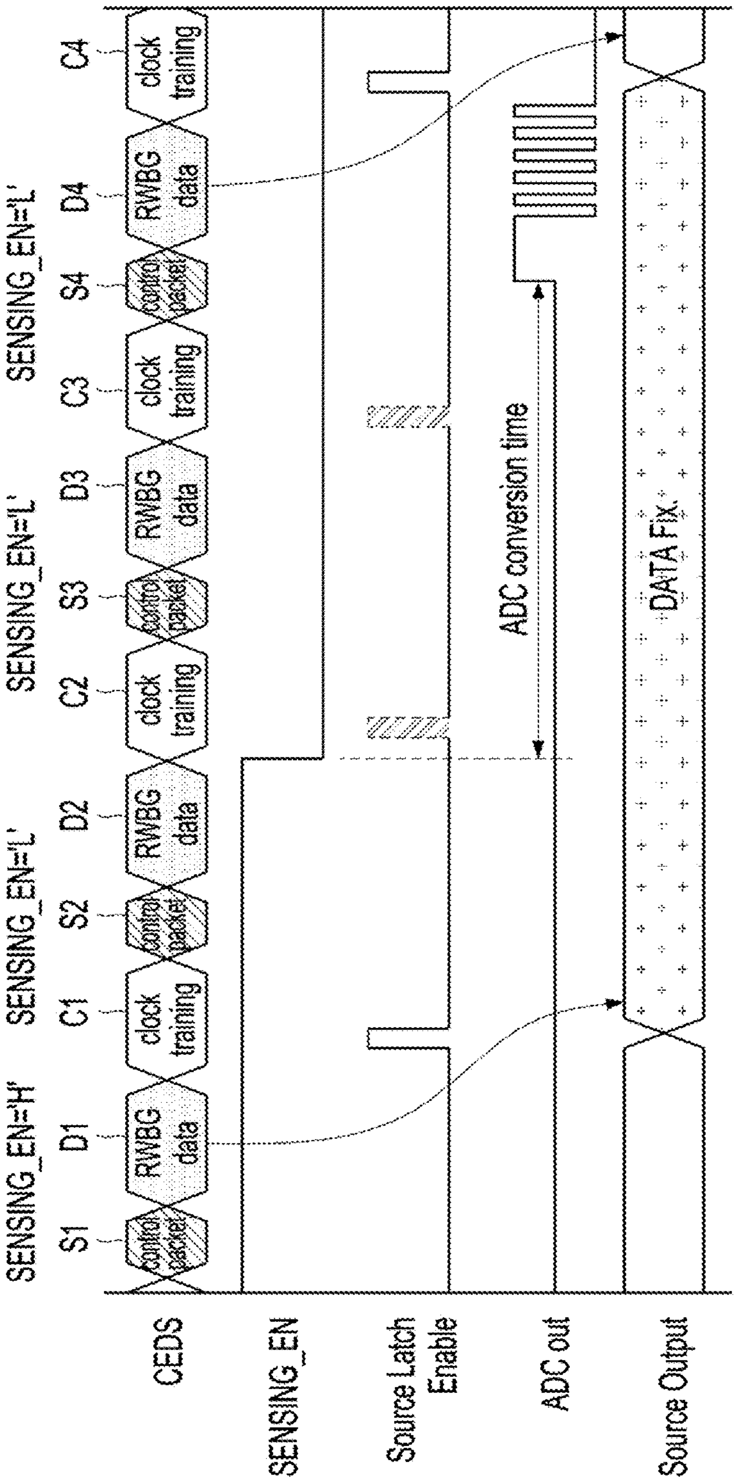
FIG. 9 is a timing diagram illustrating signals that are processed by the integrated circuit according to an embodiment.

FIG. 9 is a timing diagram illustrating signals that are processed by the integrated circuit according to an embodiment.

Referring to FIG. 9, as described above with reference to FIG. 5, the controller 310 may perform control so that an operation of the first latch circuit 421 or the second latch circuit 422 is stopped for the time interval in which the ADC 620 of the sensing circuit 130 converts a sensing signal into digital data. If the first latch circuit 421 or the second latch circuit 422 does not operate, although new image data is received from the data processing circuit 150, image data stored in the first latch circuit 421 may not be updated or image data updated in the second latch circuit 422 may not be provided to the D/A converter 430. For example, as illustrated in FIG. 9, although image data is transmitted to the first latch circuit 421, an enable signal (Source Latch Enable) of the first latch circuit 421 or the second latch circuit 422 may be masked so that image data stored in the first latch circuit 421 or the second latch circuit 422 is not updated.

If image data stored in the first latch circuit 421 is not updated, the second latch circuit 422 may continuously output the same image data as previous image data to the D/A converter 430. As the same image data is input to the D/A converter 430, the output buffer 440 may continuously output image data having the same voltage.

For the time interval in which the ADC of the sensing circuit 130 converts the sensing signal into the digital data, image data output by the data driving circuit 120 (e.g., the output buffer 440) is not changed and is identically maintained. Accordingly, the occurrence of noise or interference in the sensing circuit 130 (e.g., the ADC) can be reduced or prevented.

In an embodiment, when identifying that an operation of the ADC 620 is terminated, the controller 310 performs control so that next display data (e.g., the fourth display data D4) is transmitted to the first latch circuit 421 normally. Accordingly, new image data may be output by the output buffer 440.

Figure 10:
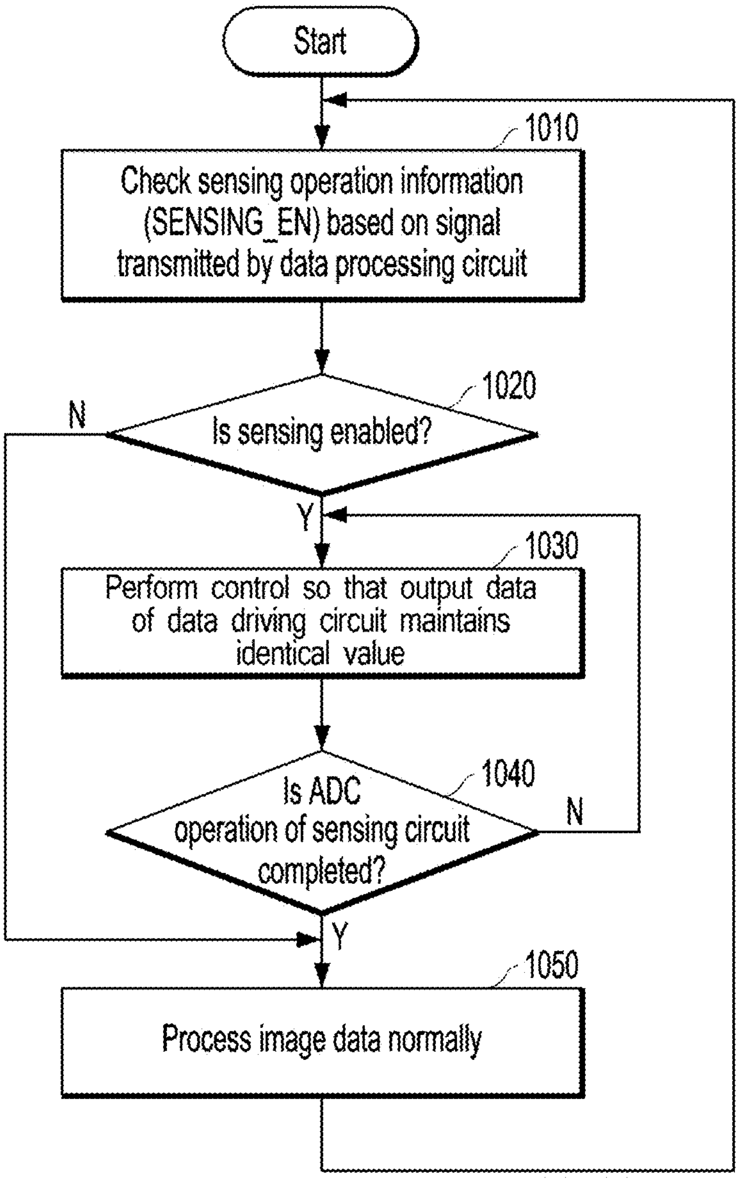
FIG. 10 is a flowchart illustrating operations that are processed by the integrated circuit according to an embodiment.

FIG. 10 is a flowchart illustrating operations that are processed by the integrated circuit according to an embodiment.

Referring to FIG. 10, as described above, the data driving circuit 120 that is connected to the pixel P included in the panel 110 through the data line DL may provide the pixel with a data voltage corresponding to image data through the data line DL.

In an embodiment, the data driving circuit 120 may identify sensing operation information based on a signal transmitted by the data processing circuit 150 (1010).

If the sensing enable information is identified as a result of the identification of the sensing operation information (1020), the sensing circuit 130 that is connected to the pixel through the sensing line SL may receive a sensing signal for the pixel through the sensing line SL. The sensing circuit 130 may generate pixel sensing data by converting the received sensing signal into the digital data through the ADC 620.

In this case, in an embodiment, as described above, the controller 310 may perform control so that image data output by the data driving circuit 120 (e.g., the output buffer 440) maintains the same value without being changed for a time interval in which the sensing circuit 130 converts the sensing signal into the digital data (1030).

In an embodiment, the controller 310 may identify that the operation of the ADC 620 of the sensing circuit 130 is completed. For example, as described above, the controller 310 may identify that the time interval in which the ADC 620 converts the sensing signal into the digital data is terminated based on the last signal of the shift register 622 that is included in the ADC 620. For example, when the last signal for controlling timing of the switches of the sample and hold circuit 621 is generated, the shift register 622 may transmit, to the controller 310, a flag indicating that the operation of the ADC 620 is terminated. The controller 310 may receive the flag from the shift register 622, and may identify that the operation of the ADC 620 is terminated.

In an embodiment, when identifying that the operation of the ADC 620 is terminated (1040), the controller 310 may perform control so that the output of the image data of the data driving circuit 120 operates normally. For example, the controller 310 may stop the control operation described with reference to FIG. 5, and may control the shift register circuit 410, first latch circuit 421, and second latch circuit 422 of the data driving circuit 120 so that the shift register circuit 410, first latch circuit 421, and second latch circuit 422 process image data normally (1050).

What is claimed is:

1. An integrated circuit comprising:

a data driving circuit configured to provide a pixel with a data voltage corresponding to image data through a data line connected to the pixel of a display panel;

a sensing circuit configured to receive a sensing signal for the pixel through a sensing line connected to the pixel and to generate pixel sensing data by converting the received sensing signal into digital data; and a controller configured to control the data driving circuit and the sensing circuit, wherein the data driving circuit comprises a shift register circuit configured to sequentially shift sampling start signals by using a clock signal included in a signal received from a data processing circuit, a latch circuit configured to sequentially latch data of respective channels supplied by the data processing circuit based on the sampling start signals output by the shift register circuit, a digital-to-analog converter configured to convert, into analog image data, digital image data latched in the latch circuit, and an output buffer configured to output the analog image data converted by the digital-to-analog converter through the data line, and the controller controls at least one of the shift register circuit and the latch circuit included in the data driving circuit such that the image data is not changed for a time interval in which the sensing circuit converts the sensing signal into the digital data, wherein:

the sensing circuit comprises an analog-to-digital converter configured to convert the received sensing signal into the digital data, wherein the analog-to-digital converter comprises:

a sample and hold circuit; and a shift register configured to control timings of switches of the sample and hold circuit, and wherein the controller identifies a termination of the time interval in which the sensing signal is converted into the digital data based on a last signal of the shift register.

2. An integrated circuit comprising:

a data driving circuit configured to provide a pixel with a data voltage corresponding to image data through a data line connected to the pixel of a display panel;

a sensing circuit configured to receive a sensing signal for the pixel through a sensing line connected to the pixel and to generate pixel sensing data by converting the received sensing signal into digital data; and a controller configured to perform control so that the image data of the data driving circuit is not changed for a time interval in which the sensing circuit converts the sensing signal into the digital data, wherein the data driving circuit comprises:

a shift register circuit configured to sequentially shift sampling start signals based on the clock signal;

a latch circuit configured to sequentially latch data of respective channels supplied by the data processing circuit based on the sampling start signals output from the shift register circuit;

a digital-to-analog converter configured to convert, into analog image data, digital image data latched in the latch circuit; and an output buffer configured to output the analog image data converted by the digital-to-analog converter through the data line, and wherein the controller performs control so that the clock signal is not transmitted to the shift register circuit for the time interval in which the sensing circuit converts the sensing signal into the digital data.

3. The integrated circuit of claim 2, wherein the data driving circuit receives a clock embedded differential signal (CEDS) from the data processing circuit and identifies a clock signal from the received CEDS.

4. The integrated circuit of claim 3, wherein the sensing circuit receives a sensing signal for the pixel through the sensing line based on sensing enable information included in the CEDS received from the data processing circuit.

5. The integrated circuit of claim 2, wherein:

the latch circuit comprises a first latch circuit configured to sequentially latch data of respective channels and a second latch circuit configured to latch the data of the respective channels latched in the first latch circuit based on an input driving signal, and the controller performs control so that an operation of the first latch circuit is stopped for the time interval in which the sensing circuit converts the sensing signal into the digital data.

6. The integrated circuit of claim 2 wherein:

the latch circuit comprises a first latch circuit configured to sequentially latch data of respective channels and a second latch circuit configured to latch the data of the respective channels latched in the first latch circuit based on an input driving signal, and the controller performs control so that data of each channel is not transmitted from the data processing circuit to the first latch circuit for the time interval in which the sensing circuit converts the sensing signal into the digital data.

7. The integrated circuit of claim 2, wherein:

the latch circuit comprises a first latch circuit configured to sequentially latch data of respective channels and a second latch circuit configured to latch the data of the respective channels latched in the first latch circuit based on an input driving signal, and the controller performs control so that data is not transmitted from the first latch circuit to the second latch circuit for the time interval in which the sensing circuit converts the sensing signal into the digital data.

8. A method of outputting a driving signal of a display panel in an integrated circuit, the method comprising:

providing a pixel with a data voltage corresponding to image data through a data line connected to the pixel of a display panel;

identifying sensing operation information based on a signal received from the data processing circuit;

receiving a sensing signal for the pixel through a sensing line connected to the pixel when identifying sensing enable information as a result of the identification of the sensing operation information; and generating, by a sensing circuit, pixel sensing data by converting the received sensing signal into digital data, wherein control is performed so that the image data of a data driving circuit is not changed for a time interval in which the sensing circuit converts the sensing signal into the digital data, further comprising:

sequentially shifting, by a shift register circuit of the data driving circuit, sampling start signals by using a clock signal;

sequentially latching, by a first latch circuit, data of respective channels provided by the data processing circuit based on the sampling start signals output by the shift register circuit;

latching, by a second latch circuit, the data of the respective channels latched in the first latch circuit based on an input driving signal;

converting, by a digital-to-analog converter, digital image data latched in the second latch circuit into analog image data; and outputting, by an output buffer, the analog image data converted by the digital-to-analog converter through the data line, and further comprising:

performing control so that the clock signal is not transmitted to the shift register circuit for the time interval in which the sensing circuit converts the sensing signal into the digital data.

9. The method of claim 8, wherein the data driving circuit receives a clock embedded differential signal (CEDS) from the data processing circuit and identifies a clock signal from the received CEDS.

10. The method of claim 9, wherein the sensing circuit receives a sensing signal for the pixel through the sensing line based on sensing enable information included in the CEDS received from the data processing circuit.

11. The method of claim 8, further comprising performing control so that an operation of the first latch circuit is stopped for the time interval in which the sensing circuit converts the sensing signal into the digital data.

12. The method of claim 8, further comprising performing control so that the data of each channel is not transmitted from the data processing circuit to the first latch circuit for the time interval in which the sensing circuit converts the sensing signal into the digital data.

13. The method of claim 8, further comprising performing control so that data is not transmitted from the first latch circuit to the second latch circuit for the time interval in which the sensing circuit converts the sensing signal into the digital data.

14. The method of claim 8, further comprising:

converting, by an analog-to-digital converter, the received sensing signal into digital data; and identifying a termination of the time interval in which the sensing signal is converted into the digital data based on a last signal of the shift register when a shift register of the analog-to-digital converter controls timings of switches of a sample and hold circuit.

* * * * *